United States Patent [19]

Johnson

[11] 3,971,866
[45] July 27, 1976

[54] THERMOFORMABLE RELEASE LINER

[75] Inventor: Erlin J. Johnson, St. Paul, Minn.

[73] Assignee: Minnesota Mining and Manufacturing Company, St. Paul, Minn.

[22] Filed: June 7, 1974

[21] Appl. No.: 477,411

[52] U.S. Cl. ............................ 428/40; 156/218; 156/229; 264/92; 428/174; 428/332; 428/451; 428/474
[51] Int. Cl.² .................... B32B 1/00; B32B 7/06
[58] Field of Search ......... 161/119, 208, 406, 413; 264/80, 90, 92; 117/122 PS, 68.5; 156/212, 218, 229, 247; 427/207; 428/474, 40, 332, 451, 174

[56] References Cited
UNITED STATES PATENTS

| | | | |
|---|---|---|---|
| 3,452,861 | 7/1969 | Erwin | 161/119 |
| 3,468,744 | 9/1969 | Reinhart | 161/406 |
| 3,507,733 | 4/1970 | Davidson | 161/406 |
| 3,509,991 | 5/1970 | Hurst | 161/406 |
| 3,518,158 | 6/1970 | Hurst | 161/406 |
| 3,565,750 | 2/1971 | Evans | 161/208 |
| 3,749,593 | 7/1973 | Keiser | 428/40 |

*Primary Examiner*—William J. Van Balen
*Assistant Examiner*—P. J. Thibodeau
*Attorney, Agent, or Firm*—Alexander, Sell, Steldt & DeLaHunt

[57] ABSTRACT

Thermoformable release liner for use in sheet products subjected to deep-draw thermoforming operations and which may be readily removed as generally one piece by hand-pulling after the thermoforming operation is completed, comprises a multilayer structure including (a) a reinforcing layer of a material that, although it is unsuitable for use as the complete release liner, provides useful properties when used as a thinner layer of the release liner, and (b) at least one additional layer adhered to the reinforcing layer to give body to the release liner.

13 Claims, No Drawings

[3,971,866]

THERMOFORMABLE RELEASE LINER

BACKGROUND OF THE INVENTION

Some deep-drawn thermoformed decorative films — such as may be used as an exterior covering on a furniture piece, desk accessory, automobile interior fitting, or the like — carry a layer of pressure-sensitive adhesive for adhering the film to a configured substrate. Providing a release liner for such a decorative film that will cover and protect the layer of pressure-sensitive adhesive prior to, during, and after the thermoforming operation is a difficult challenge, requiring a sheet materal having an unusual combination of physical properties.

For example, the release liner must elongate and conform generally the same amount as the decorative film elongates and conforms during the thermoforming operation (in a deep-drawn thermoforming operation the film is generally elongated at least 50 percent during the operation, and parts of the film may be drawn larger amounts, so as to take the form of a particular detail or to be drawn into a sharp corners). Despite elongating to this extent during the thermoforming operation, the release liner must remain a continuous protective sheet that preferably can be removed as a single piece. Maintaining the integrity of the release liner is complicated by the fact that the heat for the operation is applied through the liner, so that the liner experiences high temperatures for a significant part of the operation.

A further requirement for base sheet materials to be used in a described release liner is that they be capable of being treated to provide preferred release properties. For example a release property is often provided by curing a silicone-based release treatment on a base sheet material at temperatures of 150°F or more. Many polymeric films will elongate under tension so easily at those temperatures that they cannot be handled on continuous process equipment.

Polyethylene and polypropylene are commonly used as release liners, but they are not fully satisfactory for the described thermoformable pressure-sensitive-adhesive-covered decorative films. One deficiency is that they must rupture or open during a thermoforming operation, so as to expose the pressure-sensitive adhesive layer and make it difficult to remove the liner in one piece. In addition, polypropylene tends to become brittle during the thermoforming operation, with the result that the liner may shatter to prevent easy removal, especially after die-cutting operations to remove flashing or unneeded sections from the thermoformed part.

Insofar as known, no one has ever provided release liners prior to the present invention that have the necessary properties for use on pressure-sensitive-adhesive-covered decorative films that are to be subjected to a deep-draw thermoforming operation. The absence of such a liner has been an obstacle to broad use of thermoformed, pressure-sensitive-adhesive-covered, decorative films.

SUMMARY OF THE INVENTION

The present invention provides multilayer release liners that have been found to be useful with adhesive-covered themoformed contoured articles. Briefly, a release liner of the invention comprises (a) a thin thermoplastic reinforcing layer that, in unelongated form requires greater than about 1000 pounds per square inch tensile stress (70 kilograms per square centimeter) to exhibit a 10 percent elongation at 150°F (65°C) and can be elongated to at least 200 percent of its original length at 325°F (160°C) and (b) at least one bodying layer united to the reinforcing layer of a material that can be elongated to at least 200 percent of its original length at 325°F (160°C) while remaining as a continuous film adhered to the reinforcing layer. The liner in its unelongated form requires less than about 3 pounds per inch width (0.5 kilogram per centimeter) tensile load to exhibit a 10 percent elongation at 325°F (160°C) and greater than about 3 pounds per inch width (0.5 kilogram per centimeter) tensile load to exhitit a 10 percent elongation at 150°F (65°C). The liner does not rupture or open during the thermoforming operation, but instead remains adhered over substantially the whole area of the adhesive layer on the contoured article; is conveniently pretreated with a preferred silicone treatment; and is conveniently removable from the adhesive layer substantially as a continuous sheet by hand-pulling.

DETAILED DESCRIPTION

A preferred material for use as the reinforcing layer in a release liner of the invention is a material that, if used as the exclusive material throughout the full thickness of the release liner, would give the release liner too high a resistance to tensile elongation for the liner to fully conform to the mold in a deep-draw thermoforming operation. However, it has been found that such a material may be used in a thinner thickness, together with a bodying layer of a material that is more soft at the thermoforming temperature, to form a release liner that will deform at the thermoforming temperature and exhibit and maintain full conformation by the release liner to the interior of a pressure-sensitive-adhesive-covered molded sheet.

For example, if a film of nylon greater than about 3–5 mils (75 to 125 micrometers) in thickness is used by itself as a release liner, it will generally not fully conform to a mold in a deep-draw thermoforming operation (the tensile strength of a 5-mil-thick film of nylon at 325°F (160°C) is about 5900 pounds per square inch (420 kilograms per square centimeter), and the yield point is about 2100 pounds per square inch (150 kilograms per square centimeter). But when nylon is present as a 0.3-mil-thick (7.5 micrometers) reinforcing layer in a 3-mil-thick (75 micrometers) liner, with the balance of the liner comprising a material such as polyethylene that is more soft at the thermoforming temperature, the liner will fully conform to the mold in a deep-draw thermoforming operation. In general, the reinforcing layer in a release liner of the invention should be capable of elongation to at least 200 percent of its original length without rupture at the temperature of the thermoforming operation, for example, 325°F (160°C). The reinforcing layer should also retain its strength properties after cooling to room temperature, so that after the thermoforming operation and any other operations (such as cutting of the thermoformed part with a die, to remove flashing that remains from the thermoforming operations) are completed, the release liner can be removed as one piece.

A release liner of the invention is preferably given a silicone treatment, generally at an elevated temperature that is less than the thermoforming temperature, and the reinforcing layer can provide support to the release liner for the silicone treatment also. A preferred silicone treatment is a cured polymeric silicone treatment as described in U.S. Pat. No. 3,565,750, and uses temperatures above 140°F (60°C). So that the release liner will not unduly elongate on process equipment during the described silicone treatment, the liner should exhibit only minimal elongation (less than 5 or 10 percent) of its original length under a tensile load of about 3 pounds per inch width (0.5 kilogram per centimeter) at the temperature of the silicone treatment, for example 150°F (65°C). The reinforcing layer, in its unelongated form, should exhibit no more than minimal elongation under a tensile stress of about 1000, and preferably 1500 pounds per square inch or more at 150°F (65°C) to permit use as bodying layers of materials that are more soft at the temperature of the silicone treatment.

The material of a bodying layer that completes the release liner generally softens more than the reinforcing layer softens at the temperature of the thermoforming operation. The bodying layer gives body to the release liner such that upon thinning of the liner during a drawing operation, the liner remains intact as a continuous sheet adhered over substantially the whole area of the adhesive layer. The bodying layer should elongate to the same extent as the reinforcing layer at the temperature of the thermoforming operation but at a lower tensile load. And the bodying layer should remain as a continuous layer adhered to the reinforcing layer throughout the thermoforming operation. The bodying layer may even melt in the thermoforming operation. But upon cooling of the release liner, it solidifies in the elongated condition of the liner. Since after melting, it has little if any "memory," it can counterbalance any tendency of the reinforcing layer to return to its original length. The bodying layer may also be chosen or modified to maximize its ability to receive and store heat (as by pigmentation) and to thus heat the reinforcing layer to a temperature at which the reinforcing layer elongates the desired amount.

Particularly useful thermoplastic polymeric materials (that is, that will soften in a thermoforming operation) for use as the reinforcing layer in a release liner of the invention are high-molecular-weight linear polyamides, more commonly known as nylons, which are the reaction product of a polycarboxylic acid such as adipic acid and a polyamine such as hexamethylenediamine or are the homopolymer of a monomer such as epsiloncaprolactam. Other useful materials for the reinforcing layer are polypropylene, polycarbonates, and polyesters that may be elongated more than 50 percent in a thermoforming operation.

Particularly useful thermoplastic polymeric materials for the bodying layer or layers of release liners of the invention are polyolefins such as polyethylene and isotactic polypropylene. Othe useful materials for the bodying layer are ethylenevinyl acetals and so-called "ionomers" (as supplied under the "Surlyn" trade name by du Pont and which are long-chain polymer molecules having dependent ionized carboxyl groups).

A release liner of the invention comprises at least two layers — the reinforcing layer and bodying layer —, and may comprise several layers, for example, a reinforcing layer with a bodying layer on each side of the reinforcing layer. A multilayer release liner of the invention is most commonly formed by coextrusion processes, but also can be prepared by hot-melt- or solvent-coating one or more of the layers onto a carrier web.

A release liner of the invention is usually between about 1 and 10 mils (25 and 250 micrometers) in thickness, and preferably is between 3 and 5 mils (75 and 125 micrometers) in thickness, with the reinforcing layer occupying a lesser thickness sufficient to provide the desired strength and deformability to the liner. The reinforcing layer can be quite thin, for example, as thin as 0.1 mil (2.5 micrometer). For reinforcing layers of nylon and similar high-tensile-strength materials, the layer will usually not be more than about 1 or 2 mils thick (25 or 50 micrometers thick), and preferably will be less than about 0.5 mil (10 micrometers) thick.

The thermoformable, pressure-sensitive-adhesive-covered base sheets to which a release liner of the invention is temporarily adhered are typically well known decorative films. One useful base sheet material incorporates a multilayer structure as described in U.S. Pat. No. 3,452,861, which comprises a bottom layer often called a background layer formed of pigmented plasticized polyvinyl resin, a print coat or patterned layer of pigmented polyvinyl chloride inks printed onto the background layer, and a bodying layer over the print coat. Such a sheet material can be laminated to additional sheet material, such as a film of acrylonitrile-butadiene-styrene polymer to increase its utility in a thermoforming process.

A pressure-sensitive adhesive may be coated directly onto the base sheet, and then the release liner laminated to the adhesive layer. Particularly useful pressure-sensitive adhesives are the acrylate-based polymers described in U.S. Pat. Re. No. 24,906. Another way to incorporate a release liner of the invention into a laminated sheet product that is to be thermoformed is to coat a layer of pressure-sensitive adhesive onto the liner, where it forms a temporary adherence to the liner. Then the adhesive-coated release liner is either laminated to a base sheet, or a base sheet is built upon the liner in various coating operations.

The invention will be further illustrated by the following example:

A release liner was prepared using a 3-mil-thick (75-micrometer-thick), multilayer, coextruded base sheet material comprising as a middle reinforcing layer that occupied about 10 percent of the thickness of the sheet material a high-molecular-weight polymeric reaction product of epsiloncaprolactam and on each side of the reinforcing layer a bodying layer of low-density polyethylene (Crown Zeelon 305 packaging film from Crown Zellerbach). This base sheet material was provided with a heat-cured polysiloxane treatment in the manner described in U.S. Pat. No. 3,565,750 by coating a solution of silicone based-material onto the sheet material and curing it in ovens heated to 150°F for several minutes.

The completed release liner was then passed through calendering rolls together with a previously prepared thermoformable sheet (a decorative film supported on an acrylonitrilebutadiene-styrene film), which carried a layer of isooctylacrylate-acrylic acid pressure-sensitive adhesive 2 to 3 mils in thickness, to adhere the liner to the adhesive layer.

The resulting laminated sheet material was then drawn into a vacuum mold having sharp rectangular corners which required elongation of the sheet material to about 60 percent of its original dimensions. In performing this operation, the sheet material was laid with the exterior surface of the decorative film against the mold, and heat was applied through the release liner by a radiant heat source. Following the thermoforming operation, the sheet material was allowed to cool and was then removed from the mold. It was found that the sheet material — including both the decorative film and the release liner — had conformed fully to the mold, and there were no ruptures in the release liner. The liner was conveniently removed as one piece by simply hand-pulling the liner away from the formed decorative film, even after the edge flashing had been die-cut from the formed part.

What is claimed is:

1. A contoured article comprising a drawn thermoformed base sheet, a layer of pressure-sensitive adhesive united to said base sheet, and a release liner temporarily adhered over substantially the whole area of said layer of adhesive, said liner (1) in its unelongated form requiring less than about 3 pounds per inch width tensile load to exhibit a 10 percent elongation at 325°F and greater than about 3 pounds per inch width tensile load to exhibit a 10 percent elongation at 150°F, (2) comprising (a) a thin thermoplastic reinforcing layer of a first material that, in its unelongated form, requires greater than about 1000 pounds per square inch tensile stress to exhibit a 10 percent elongation at 150°F and can be elongated to at least 200 percent of its original length at 325°F and (b) at least one bodying layer united to the reinforcing layer of a second material that can be elongated to at least 200 percent of its original length at 325°F while remaining as a continuous film adhered to the reinforcing layer, and (3) being removable from the adhesive layer as a continuous sheet by hand-pulling.

2. A contoured article of claim 1 in which the reinforcing layer of the release liner comprises nylon.

3. A contoured article of claim 1 in which the bodying layer comprises polyethylene or polypropylene.

4. A contoured article of claim 2 in which the bodying layer comprises polyethylene or polypropylene.

5. A contoured article of claim 1 in which the reinforcing layer is between 0.1 and 2 mils in thickness.

6. A contoured article of claim 1 in which the release liner carries a cured polymeric silicone treatment that gives the liner improved release properties.

7. A contoured article of claim 1 in which the melting point of said second material is less than 325°F.

8. A contoured article comprising a drawn thermoformed base sheet, a layer of pressure-sensitive adhesive united to said base sheet, and a release liner temporarily adhered over substantially the whole area of said layer of adhesive, said liner (1) in its unelongated form requiring less than about 3 pounds per inch width tensile load to exhibit a 10 percent elongation at 325°F and greater than about 3 pounds per inch width tensile load to exhibit a 10 percent elongation at 150°F, (2) comprising (a) a thermoplastic nylon reinforcing layer that in its unelongated form, requires greater than about 1000 pounds per square inch tensile stress to exhibit a 10 percent elongation at 150°F and can be elongated to at least 200 percent of its original length at 325°F and (b) at least one bodying layer united to the reinforcing layer of a thermoplastic material selected from polyethylene that can be elongated to at least 200 percent of its original length at 325°F while remaining as a continuous film adhered to the reinforcing layer, (3) carrying a cured polymeric silicone treatment that gives the liner improved release properties, and (4) being removable from the adhesive layer as a continuous sheet by hand-pulling.

9. A multilayered sheet product suitable for deep-draw thermoforming operations comprising a thermoformable base sheet, a layer of pressure-sensitive adhesive united to said base sheet, and a release liner temporarily adhered to said layer of adhesive, said liner (1) in its unelongated form requiring less than about 3 pounds per inch width tensile load to exhibit a 10 percent elongation at 325°F and greater than about 3.0 pounds per inch width tensile load to exhibit a 10 percent elongation at 150°F, (2) comprising (a) a thin thermoplastic reinforcing layer of a first material that, in its unelongated form, requires greater than about 1000 pounds per square inch tensile stress to exhibit a 10 percent elongation at 150°F and can be elongated to at least 200 percent of its original length at 325°F, and (b) at least one bodying layer united to the reinforcing layer of a thermoplastic material that can be elongated to at least 200 percent of its original length at 325°F while remaining as a continuous film adhered to the reinforcing layer, and (3) being removable from the adhesive layer as a continuous sheet by hand-pulling.

10. A sheet product of claim 9 in which the reinforcing layer of the release liner comprises nylon.

11. A sheet product of claim 9 in which the bodying layer comprises polyethylene or polypropylene.

12. A sheet product of claim 10 in which the bodying layer comprises polyethylene or polypropylene.

13. A sheet product of claim 9 in which the reinforcing layer is between 0.1 and 2 mils in thickness.

* * * * *

UNITED STATES PATENT AND TRADEMARK OFFICE
CERTIFICATE OF CORRECTION

PATENT NO. : 3,971,866

DATED : July 27, 1976

INVENTOR(S) : Erlin J. Johnson

It is certified that error appears in the above-identified patent and that said Letters Patent are hereby corrected as shown below:

In column 1, line 19, "drawn" should be --draw--.

In column 1, line 45, "must" should be --may--.

In column 6, line 14, after "polyethylene" insert --and polypropylene--.

Signed and Sealed this

Twenty-sixth Day of October 1976

[SEAL]

Attest:

RUTH C. MASON
Attesting Officer

C. MARSHALL DANN
Commissioner of Patents and Trademarks